United States Patent [19]

Kutaragi

[11] Patent Number: 4,609,949
[45] Date of Patent: Sep. 2, 1986

[54] MAGNETIC DISC REPRODUCING APPARATUS

[75] Inventor: Ken Kutaragi, Kanagawa, Japan

[73] Assignee: Sony Corporation, Tokyo, Japan

[21] Appl. No.: 733,251

[22] Filed: May 13, 1985

[30] Foreign Application Priority Data

May 21, 1984 [JP] Japan .................... 59-102056

[51] Int. Cl.$^4$ .................... G11B 5/02; G11B 15/12
[52] U.S. Cl. .................... 360/28; 360/27; 360/61
[58] Field of Search .................... 360/27, 28, 36.2, 18, 360/61, 134

[56] References Cited

U.S. PATENT DOCUMENTS 3,932,894  1/1976  Arter et al. .................... 360/134
4,445,151  4/1984  Kinoshita et al. .................... 360/27

Primary Examiner—Vincent P. Canney
Attorney, Agent, or Firm—Lewis H. Eslinger; Alvin Sinderbrand

[57] ABSTRACT

A magnetic disc reproducing apparatus for reproducing analog or digital information signals selectively recorded in a plurality of tracks of a magnetic disc includes a transducer placed in transducing relation with the plurality of tracks for reproducing the information signals recorded in one of the tracks, a checking circuit connected to the transducer for checking a portion of the reproduced information signals and an identifying circuit connected to the checking circuit for identifying whether analog or digital information signals are being reproduced.

4 Claims, 7 Drawing Figures

MAGNETIC DISC REPRODUCING APPARATUS

BACKGROUND OF THE INVENTION

1. Field of the Invention

This invention relates generally to a magnetic disc reproducing apparatus and, in particular, is directed to a magnetic disc reproducing apparatus in which a flexible disc cartridge (floppy disk) for an electronic still camera is used alternatively as a medium for storing digital data.

2. Description of the Prior Art

A prior art 8-inch or 5.25-inch floppy disk is standardized in its format and almost all of the disk drives are operated in accordance with that standardized format. As a result, it is very difficult to employ advanced technology for realizing higher density recording and/or reproducing in the prior art system. Further, since the rotation speed of a magnetic disk incorporated in the prior art floppy disk system is usually 300 r.p.m. or 600 r.p.m., it is impossible to use such system to record and/or reproduce an analog video signal in real time. If the video signal is digitized, it can be recorded and/or reproduced, but then one floppy disk is capable of at best recording only one still video picture if its receptacle jacket size is to be maintained at 8-inch or 5.25-inch. Furthermore, for such use of the known system in addition to an A/D (analog-to-digital) converter and a D/A (digital-to-analog) converter, the frame memory is required so that a total system becomes very expensive and large in size.

Accordingly, it is not practical to use the prior art floppy disk system to record and/or reproduce the video signal.

An electronic still camera conference convened in Japan therefore proposed a 2-inch floppy disk as a recording medium for an electronic still camera. FIG. 1 is a diagram of such 2-inch floppy disk and illustrates the general construction thereof.

In FIG. 1, reference numeral 1 generally designates the proposed floppy disk and reference numeral 2 designates a flexible magnetic disk incorporated in the floppy disk 1. The magnetic disk 2 is 47 mm in diameter and 40 μm in thickness and is provided at its center portion with a center core 3 with which the spindle of a drive mechanism (not shown) is engageable. The center core 3 is provided with a magnetic piece or member 4 which can be used for sensing the rotational position when the magnetic disk 2 rotates.

Reference numeral 5 designates a receptacle or jacket for the magnetic disk 2. This jacket 5 is 60×54×3.6 mm in size and has the magnetic disk 2 freely rotatable therein. The jacket 5 includes a central opening 5A to expose therethrough the center core 3 and the magnetic piece 4 to the outside. The jacket 5 is further provided with another opening 5B through which a magnetic head (not shown) can contact with the magnetic disk 2 upon recording and/or reproducing. When the floppy disk 1 is not in use, the opening 5B is closed by a slidable dust-proof shutter 6. Reference numeral 7 designates a counter dial for indicating the number of pictures taken by an electronic camera and reference numeral 8 designates a tab member the presence or absence of which can be detected for preventing the accidental recording of signals on disk 2 when information already recorded thereon is to be preserved. The tab member 8 is removed when recording is to be inhibited.

Upon recording, 50 magnetic tracks can be concentrically formed on one surface of the magnetic disk 2 and the outermost track is represented as the first track and the innermost track is represented as the 50th track. Each track width is 60 μm and the guard band width between tracks is 40 μm, respectively.

In taking a picture, the magnetic disk 2 is rotated at 3600 r.p.m. (field frequency) and a color video signal of one field is recorded in a selected single track of the magnetic disk 2. In this case, the color video signal Sa to be recorded includes, as shown in FIG. 2, a luminance signal Sy which is frequency-modulated to a frequency modulated signal Sf, wherein the sync tip level of this signal is 6 MHz and the white peak level is 7.5 MHz. For a chrominance signal in the signal Sa to be recorded, there is formed a line sequential color signal Sc which consists of a frequency modulated red color difference signal (center frequency is 1.2 MHz) and a frequency modulated blue color difference signal (center frequency is 1.3 MHz). The signal Sa is obtained by adding the frequency modulated color signal Sc and the frequency modulated luminance signal Sy for recording on the magnetic disk 2.

As described above, the floppy disk 1 shown in FIG. 1 has the proper size, function and characteristics for use as a recording medium for 50 still color video signals.

Since, however, the floppy disk 1 was first standardized to record and/or reproduce an analog color video signal as set forth above, it can not easily handle digital data. If, for example, digital data is converted to quasi video signal and then recorded on the floppy disk 1 just as in an audio PCM (pulse code modulation) processor for a VTR (video tape recorder), the floppy disk 1 is small in memory capacity for the original digital data and also there are many other problems, such as, a lack of data compatibility with an existing 8-inch or 5.25-inch floppy disk, a difference of broadcasting system, an undesirably enlarged circuit, etc.

Alternatively, when the color video signal is recorded on or reproduced from the floppy disk 1, such operations are carried out in accordance with the above-mentioned format, while when the digital data is recorded on or reproduced therefrom, it is carried out in accordance with the format of the prior art floppy disk. In that case, when the floppy disk 1 is viewed as a recording medium for the video signal, it has a very high recording density 7, while when it is used for recording the digital data, it has a low recording density 7 and thus, full use of the floppy disk 1 is not being achieved.

When the video signal and the digital data are recorded on or reproduced from one floppy disk 1 in an intermixed manner, both signals have largely different frequency bands and characteristics so that it becomes difficult to record and reproduce the video signal and the digital data together under optimum conditions in respect to the electromagnetic transducer characteristic, head-disk contact condition and so on. Further, when the video signal and the digital data are recorded and/or reproduced in an intermixed manner on one floppy disk 1, the drive unit for rotating the floppy disk 1 must be rotated at 300 r.p.m. (600 r.p.m.) when recording or reproducing digital data and at 3600 r.p.m. for the video signal, so that when the revolution speed of the floppy disk 1 is selectively changed, problems occur, such as, the floppy disk 1 cannot be accessed for several seconds until the servo is stabilized, the manufacturing cost becomes increased and so on.

Therefore, it has been considered that the floppy disk 1 should use the following format so as to become able to appropriately record and reproduce the video signal and also the digital data.

In FIG. 3A, reference numeral 2T designates one of the tracks on the magnetic disk 2. This track 2T is equally divided into four 90° intervals in its circumferential direction with the magnetic piece 4 as a reference. Each of the four divided intervals is called a block BLCK and the block BLCK of the interval containing the magnetic piece 4 is identified as block 0 and the succeeding three blocks are represented as block 1, block 2 and block 3, sequentially.

As shown in FIG. 3B, in each block BLCK, an interval of 4° from its beginning is represented as a gap interval GAP which affords a margin upon reading and writing. A succeeding interval of 1° is represented as a burst interval BRST. In this case, in the block 0 BLCK, the center of the gap interval GAP corresponds to the position of the magnetic piece 4. The burst interval BRST is an interval in which there is recorded and/or reproduced a burst signal BRST which serves as
 (i) a preamble signal
 (ii) a signal indicative of a recording density of a recorded signal; and
 (iii) a flag signal indicating that the respective recorded signal is a digital signal.

The burst interval BRST is followed by an interval for an index signal INDX. In this case, as shown in FIG. 3C, the index signal INDX consists of a flag signal FLAG of 8 bits, an address signal IADR of 8 bits, a reserved signal RSVD of 40 bits and a check signal ICRC of 8 bits. The flag signal FLAG is to indicate whether the track 2T to which the block BLCK belongs is defective or not or whether the track 2T is erased or not and so on. The address signal IADR is to indicate the number (1 to 50) of the track 2T and the number (0 to 3) of the block BLCK, and the check signal ICRC is a CRCC (cyclic redundancy check code) for the flag signal FLAG, the address signal IADR and the reserved signal RSVD.

An interval which follows the index interval INDX is equally divided into 128 frame intervals and a signal identified as a frame FRM is recorded on or reproduced from each of these intervals.

More particularly, as shown in FIG. 3D, each frame FRM includes from its beginning sequentially a frame synchronizing signal SYNC of 8 bits, a frame address signal FADR of 16 bits, a check signal FCRC of 8 bits, digital data DATA of 16 bytes (one byte=8 bits), redundant or parity data PRTY of 4 bytes, another digital data DATA of 16 bytes and another redundant or parity data PRTY of 4 bytes. In this case, the check signal FCRC is a CRCC for the frame address signal FADR. The digital data DATA is the original data which should be accessed by a host computer or apparatus and this digital data DATA is interleaved within a period of digital data of one block BLCK. The redundant data PRTY are parity data $C_1$ and $C_2$ which are generated by the Reed Solomon coding method having minimum distance 5 for digital data of one block (32 bytes × 128 frames).

Accordingly, the capacities for digital data of one block BLCK, one track 2T and one disk 1 are as follows:
 One block: 4096 bytes (=32 bytes×128 frames)
 one track: 16K bytes (=4096 bytes×4 blocks)
 one disk: 800K bytes (=16K bytes×50 tracks)
The numbers of bits in one frame FRM and one block BLCK are as follows:
 One frame: 352 bits=(8+16+8 bits)+(16+4 bytes)×8 bits×2 frames)
 one block (only index interval and frame interval): 45120 bits (=352 bits×128 frames) In practice, however, when the digital signal is recorded on or reproduced from the disk 2, a DSV (digital sum value) is required to be small and a ration Tmin (minimum length between transition)/Tmax (maximum length between transition) is required to be small, while a window margin Tw is required to be large. Thus, all of the afore-described digital signals are subjected to 8/10 (eight-to-ten)-conversion with Tmax=4T and then recorded on the disk 2. Upon reproducing, the digital signals are subjected to a reverse conversion and then subjected to the succeeding inherent signal processing.

Accordingly, in the case of the above-described data density, the practical number of the bits in the disk 2 is multiplied by 10/8 and presented as:
 one frame: 440 channel bits
 one block (only the index interval and frame interval): 56400 channel bits Thus, the total number of the bits in the whole interval of one block corresponds to 59719 channel bits (≃56400 channel bits×90°/85°). Since, in practice, the length of each interval is assigned by the number of the channel bits as mentioned above, the total angle of the frame intervals is a little shorter than 85°.

Consequently, the bit rate at which the disk 2 is accessed by the digital signal after its 8/10-conversion) is presented as
 14.32 M bits/sec (≃59719 bits×4 blocks×field frequency) and one bit corresponds to 69.8 nano seconds (≃1/14.32 M bits).

As described above, according to the format shown in FIGS. 3A–3D, digital data of 800K bytes can be written on or read out from the floppy disk 1 of 2-inch size and this capacity is more than twice the capacity (320K bytes) of the prior art 5.25-inch floppy disk. Thus, this 2-inch floppy disk 1 has a large capacity in spite of its small size.

Since the disk 2 is rotated at the same rotational speed in the case of recording digital data as in the case of a color video signal recording, when the color video signal and the digital data are recorded on or reproduced from the disk 2 in an intermixed manner, both signals to be recorded on or reproduced from the disk 2 become similar in frequency spectrum and so on, so that they can be recorded on or reproduced from the disk 2 under the optimum conditions such as the electromagnetic conversion characteristic, the contact condition with a magnetic head and the like. Further, even when the two signals are recorded on or reproduced from the disk 2 in an intermixed manner, since the rotational speed of the disk 2 is not changed over, it is not necessary to afford extra time to change-over the servo circuit and thus the two signals can be selectively used immediately. In addition, since the only a single rotational speed of the disk 2 is used and a mechanism such as an electromagnetic transducer system or the like has the same characteristic and function for both types of signals this is advantageous from the standpoint of costs.

Even though the floppy disk 1 of FIG. 1 was originally intended for the analog signal as mentioned above, if the format of FIG. 3 is applied thereto, the floppy disk 1 can achieve a new effect as a floppy disk of the next generation.

By the way, in the case of the prior art floppy disk, the data transfer between it and the peripheral instruments is carried out directly at a speed determined by the rotational speed of the disk without using a buffer memory therebetween. Further, data is allocated on the floppy disk such that data is written in or read out from the floppy disk at sector unit with its address data being made consecutive. In other words, the time sequence of the data recorded on the floppy disk is continuous relative to the original time sequence.

However, in the above-mentioned floppy disk of the next generation, higher transfer speed is required as the digital magnetic recording becomes higher in density. Furthermore, since the data is added with a redundant bit for error correction and re-arranged by interleaving, the time sequence of the resultant data is not the same as the original time sequence on the floppy disk. As a result, the floppy disk can not be directly connected with the peripheral instruments.

Therefore, it may be considered to interpose a buffer memory between the floppy disk and the peripheral instruments. If, however, the data having the data allocation corresponding to the recorded pattern on the floppy disk is written in or read out from the buffer memory as it is, the logical data address as seen from the peripheral instruments is not continuous. Accordingly, when the data is transferred in a DMA (direct memory access) manner so as to transfer the data at high speed, since the data must be transferred with its address being consecutive, such address is not matched with the buffer memory, and thence the data can not be transferred at high speed.

To overcome the above-described shortcoming, it may be considered that upon recording, after the addition of the parity data $C_1$ and $C_2$, and upon reproducing, after the error correction process, the data within the buffer memory is re-arranged such that the data is stored in the buffer memory with its address successive in respect to the original time sequence. This, however, requires extra memory capacity and a conversion time for re-arranging the data, which is not desirable.

OBJECTS AND SUMMARY OF THE INVENTION

Accordingly, it is an object of this invention to provide a magnetic disc reproducing apparatus which can properly discriminate an analog video signal and digital data from each other, in which case the analog video signal and the digital data can be recorded on a floppy disk in an.

It is another object of this invention to provide a magnetic disc reproducing apparatus by which a great variety of data and informations can be associated with each other and processed.

According to one aspect of the present invention, there is provided a magnetic disc reproducing apparatus for reproducing information signals from one of a plurality of tracks of a magnetic disc comprising:
transducer means placed in transducing relation with said plurality of tracks for reading out said information signals from said tracks;
means connected to said transducer means for checking a portion of said information signals; and
means connected to said checking means for identifying characteristics of said information signals being reproduced and thereby discriminating between different types of the information signals.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

Now, the magnetic disc reproducing apparatus according to this invention will hereinafter be described with reference to FIG. 4.

Figure 1:
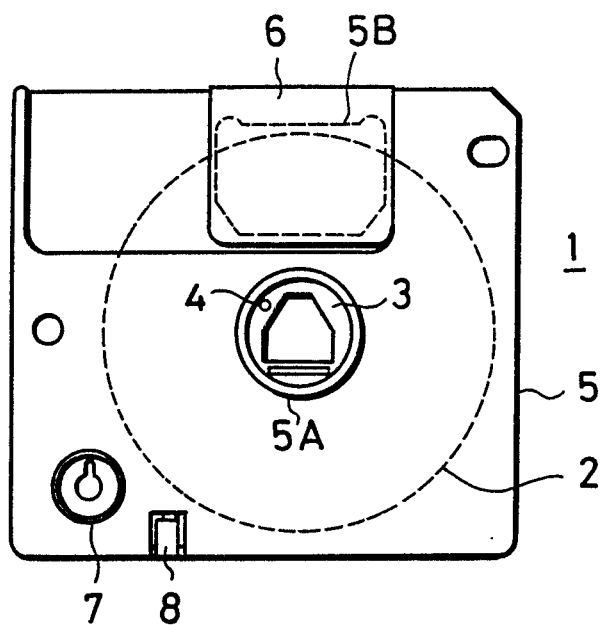
FIG. 1 is a diagram of a prior art floppy disk, illustrating the overall construction thereof.
Figure 2:
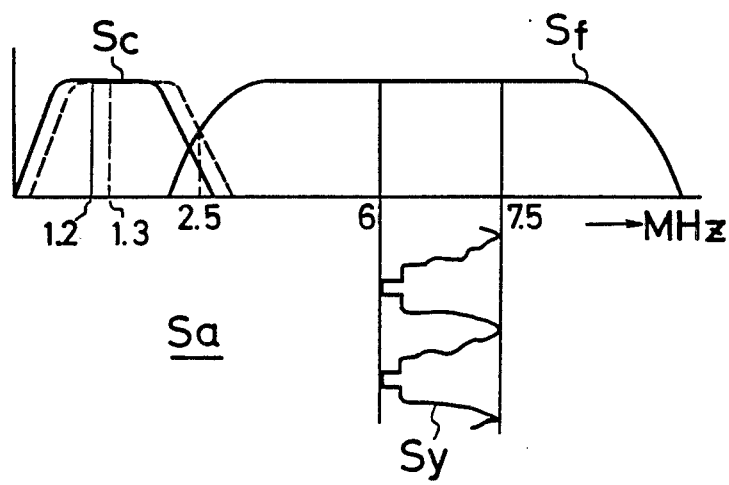
FIG. 2 is a waveform diagram showing an example of a color signal recorded on the floppy disk of FIG. 1.
Figure 3:
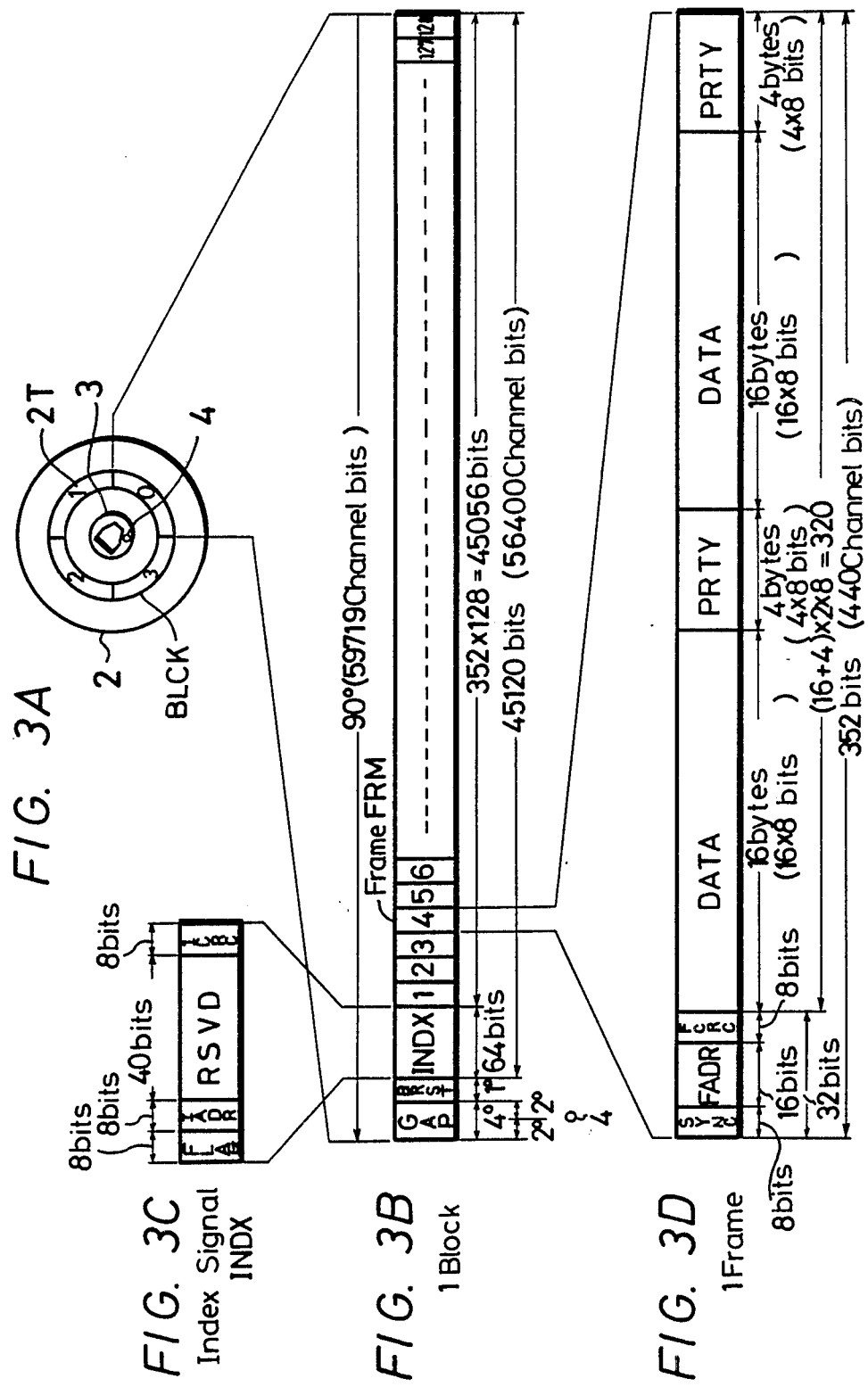
FIGS. 3A to 3D are respectively diagrams useful for explaining a format on the floppy disk.
Figure 4:
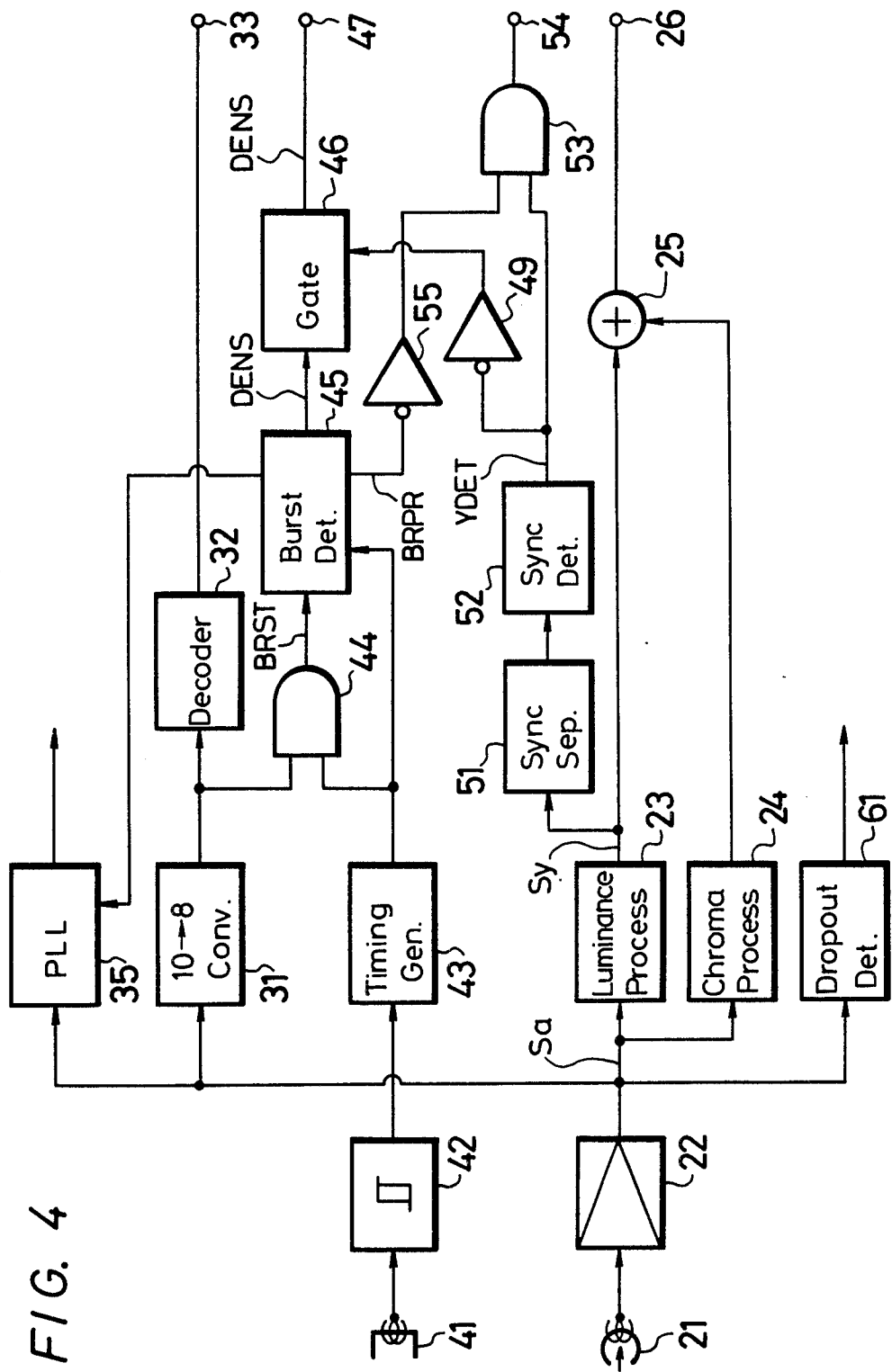
FIG. 4 is a systematic block diagram showing an embodiment of a magnetic disc reproducing apparatus according to this invention.

In FIG. 4, reference numeral 21 designates a playback head. Upon playback, this playback head 21 contacts with the magnetic disc 2 through the opening 5B of the jacket 5 of floppy disk 1 (shown in FIG. 1) so that the playback head 21 reproduces the signal recorded on the track 2T of disk 2. The reproduced signal from the playback head 21 is supplied through a playback amplifier 22 to a luminance signal processing circuit 23, a chrominance signal processing circuit 24 and a 10-8 (ten-to-eight) converting circuit 31.

When the reproduced signal of the playback head 21 is an analog signal (for example, the color signal signal Sa), the luminance signal processing circuit 23 separates the FM signal Sf from the color video signal Sa and demodulates the luminance signal Sy from the separated signal Sf. Then this demodulated luminance signal Sy is supplied to an adding circuit 25. At the same time, in the chrominance signal processing circuit 24, the line-sequential signal is separated from the color video signal Sa, changed into simultaneous signals, frequency-demodulated and then orthogonally two-phase balanced-modulated to thereby become a carrier chrominance signal of the NTSC system. This carrier chrominance signal is also supplied to the adding circuit 25.

Accordingly, in the adding circuit 25, the carrier chrominance signal is added to the luminance signal Sy and thus a color video signal of the NTSC system is developed at an output terminal 26.

When, on the other hand, the reproduced signal from the playback head 21 is a digital signal, such digital signal is converted from serial data to parallel data at the 10-8 converting circuit 31 and converted to the 8-bit digital signal Sd. This signal Sd is supplied to a decoder 32 in which the digital data DATA is de-interleaved and error-corrected by using the redundant or parity code PRTY to thereby be decoded to the original parallel data of 8 bits. This digital data is delivered to a terminal 33.

When reproducing a digital signal, the reproduced signal from the amplifier 22 is supplied to a PLL (phase locked loop) circuit 35 which then produces a clock pulse. This clock pulse from the PLL circuit 35 is supplied to the converting circuit 31 and other circuits.

In order to discriminate between the two types of the reproduced signals from the playback head 21, the magnetic disc reproducing apparatus of this invention is further arranged as follows:

Reference numeral 41 designates a magnetic head. This magnetic head 41 is disposed near the rotation surface of the magnetic piece 4 of the floppy disk 1 (FIG. 1) and produces a pulse indicative of the rotary phase of the floppy disk 1 at every rotation thereof. This pulse is supplied through a waveform shaping amplifier 42 to a timing generator 43 which then produces a window pulse WNDW indicative of the burst interval BRST at every block BLCK of the track 2T. This pulse WNDW and the signal Sd from the converting circuit 31 are supplied to respective inputs of an AND circuit 44.

Reference numeral 45 designates a burst detecting circuit. This burst detecting circuit 45 is formed of a frequency-voltage converting circuit, a level detecting circuit and so on and is connected to the output of AND circuit 44 whereby to detect the presence or absence of the burst signal BRST and the recording density exhibited by the burst signal BRST. The burst detecting circuit 45 produces a signal BRPR which becomes "1" in the presence of the burst signal BRST and a parallel detecting signal DENS which changes its value in accordance with the recording density indicated by the burst signal BRST. At the same time, the pulse WNDW from the timing generator 43 is supplied to the burst detecting circuit 45 as a latch signal therefor. Reference numeral 46 designates a gate circuit which receives the signal DENS from circuit 45.

Further, reference numeral 51 designates a synchronizing signal separating circuit which separates the synchronizing signal on the basis of its frequency, and reference numeral 52 designates a synchronizing pulse detecting circuit. When the luminance signal Sy is produced from the processing circuit 23, this signal Sy is supplied to the separating circuit 51 and the horizontal synchronizing pulse is derived therefrom. The presence or absence of the synchronizing pulse is detected by the detecting circuit 52 and the detected output YDET thereof becomes "1" in the presence of the horizontal synchronizing pulse. Accordingly, when the luminance signal Sy is produced from the processing circuit 23, YDET= "1" is established and thus the YDET serves as the detecting signal for detecting the presence or absence of the luminance signal Sy.

Reference numeral 61 designates a dropout detecting circuit and this detecting circuit 61 is connected to the playback amplifier 22. When a dropout occurs in the reproduced signal from the playback head 21 (or no reproduced output exists), the dropout detecting circuit 61 produces the detecting signal which indicates the presence of the dropout. This detecting signal is used as a control signal for a dropout compensating circuit (not shown) of the processing circuit 23, and for a pointer for indicating missing digital data from the decoder 32, or as a tracking servo signal for the playback head 21 and so on.

Accordingly, when the reproduced signal from the playback head 21 is the digital signal, the burst signal BRST is derived from the digital signal Sd in the AND circuit 44 and this burst signal BRST is supplied to the detecting circuit 45 so that the signal DENS indicative of the recording density is produced from the detecting circuit 45. This signal DENS is delivered to the gate circuit 46.

At this time, since the luminance signal Sy is not provided from the processing circuit 23, the detecting signal YDET from synchronizing pulse detecting circuit 52 is "0" and this signal YDET is supplied through an inverter 49 to the gate circuit 46 as its control signal. Accordingly, the signal DENS indicative of the recording density from the detecting circuit 45 is delivered through the gate circuit 46 to a terminal 47.

Further, at this time, since the burst signal BRST exists, the corresponding detecting signal BRPR from burst detector 45 is "1". This signal BRPR is supplied through an inverter 55 to an AND circuit 53, and, the luminance signal Sy is not produced, the corresponding signal YDET is "0". This signal YDET is also supplied to the AND circuit 53 and thus the output of the latter supplied to a terminal 54 becomes "0".

In addition, at this time, a signal similar to the signal DENS is supplied from the detecting circuit 45 to the PLL circuit 35 and the frequency-dividing ratio of the PLL circuit 35 or the like is controlled in accordance with the recording density.

On the other hand, when the reproduced signal from the playback head 21 is the analog signal (color video signal) Sa, the detecting signal YDET indicating the presence of the luminance signal Sy becomes "1" and the detecting signal BRPR indicating the absence of the burst signal BRST becomes "0" so that the output of the AND circuit 53 becomes "1".

At this time, since YDET= "1" is established, the output of the inverter 49 becomes "0" so that gate 46 is not enabled and no output is produced at the terminal 47.

Accordingly, the output of AND circuit 53 appearing at the terminal 54 becomes a flag indicative of whether the presently reproduced signal is either the color video signal or the digital data. That is, when the output flag at the terminal 54 is "0", this flag indicates that the present reproduced signal is the digital data. At this time, the digital data is produced at the terminal 33 and the signal DENS indicative of the recording density is produced at the terminal 47. Moreover, when the output flag at the terminal 54 is "1", this flag indicates that the present reproduced signal is the color video signal. At this time, the color video signal is developed at the terminal 26.

Further, the presence or absence of a reproduced signal itself is learned by the output from the dropout detecting circuit 61.

As set forth above, according to the present invention, even if the color video signal and the digital data are recorded on the floppy disk 1 in an intermixed manner, that is, with the color video signal recorded in certain tracks and the digital data recorded in other tracks on the same floppy disk, they can properly be discriminated from each other. Consequently, since the analog video signal and the digital data can be recorded on a single floppy disk employed in a single drive unit, not only the jacket of the disc for the electronic still camera and the jacket of the floppy disk become the same but also a wide variety of data and information can be associated with one another and used at low cost and with ease.

The above description relates to a single preferred embodiment of the invention, but it will be apparent that many modifications and variations could be effected by one skilled in the art without departing from the spirit or scope of the novel concepts of the invention, so that the scope of the invention should be determined by the appended claims only.

I claim as my invention:

1. A magnetic disk reproducing apparatus for reproducing analog and digital information signals which are recorded in respective tracks on a magnetic disk and which include synchronizing and burst signals, respectively, as essential components of the recorded analog and digital information signals, said apparatus comprising:

transducer means in transducing relation with said tracks for reproducing the analog or digital information signals from a selected one of said plurality of tracks while the disk is driven at a predetermined rotational speed;

means connected with said transducer means for isolating from the information signals reproduced by said transducer means said synchronizing and burst signals, respectively; and means for detecting the isolated synchronizing and burst signals, respectively, for indicating when the reproduced information signals are analog and digital signals, respectively.

2. A magnetic disk reproducing apparatus according to claim 1; in which said analog information signal is a color video signal in which said synchronizing signal is included with a characteristic frequency, and said digital information signal is recorded in the respective track of said disk with said burst signal at a predetermined circumferential position along the track; and in which said means for isolating the synchronizing and burst signals includes synchronizing signal separating means connected with the output of said transducer means for separating said synchronizing signal therefrom on the basis of said characteristic frequency when said selected one of the tracks has said color video signal recorded thereon, means for detecting the rotational position of the disk, and burst signal separating means connected with the output of said transducer means and times in response to said means for detecting the rotational position of the disk for separating said burst signal from said output on the basis of said predetermined circumferential position along said selected one track when the latter has said digital signal recorded therein.

3. A magnetic disk reproducing apparatus according to claim 2; in which said means for detecting the isolated synchronizing and burst signals includes sync signal detecting means for receiving the isolated synchronizing signal and providing a detecting means for receiving the isolated burst signal and providing a detected output in response thereto and a density indicating output corresponding to the recorded density of the digital signal.

4. A magnetic disk reproducing apparatus according to claim 3; further comprising gate means receiving said density indicating output of the burst signal detecting means, first inverting means receiving said detected output of the sync signal detecting means and enabling said gate means in response to the inverse of said detected output of the sync signal detecting means, AND circuit means having a first input receiving said detected output of the sync signal detecting means and a second input, and second inverting means receiving said detected output from the burst signal detecting means and providing an inverse detected output to said second input of said AND circuit means so that the latter provides a flag output indicating whether the signal being reproduced is an analog color video signal or a digital signal.

* * * * *